(12) United States Patent
Kimura et al.

(10) Patent No.: US 11,511,806 B2
(45) Date of Patent: Nov. 29, 2022

(54) VEHICLE

(71) Applicants: TOYOTA JIDOSHA KABUSHIKI KAISHA, Aichi (JP); SUBARU CORPORATION, Tokyo (JP)

(72) Inventors: Ryo Kimura, Tokyo-to (JP); Tomohiro Matsumoto, Tokyo-to (JP)

(73) Assignees: TOYOTA JIDOSHA KABUSHIKI KAISHA, Aichi-Ken (JP); SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/037,680

(22) Filed: Sep. 30, 2020

(65) Prior Publication Data

US 2021/0122422 A1 Apr. 29, 2021

(30) Foreign Application Priority Data

Oct. 24, 2019 (JP) .............................. JP2019-193498

(51) Int. Cl.
*B62D 21/11* (2006.01)
*B60G 7/00* (2006.01)
*B60G 7/02* (2006.01)
*B62D 25/02* (2006.01)

(52) U.S. Cl.
CPC .............. *B62D 21/11* (2013.01); *B60G 7/001* (2013.01); *B60G 7/02* (2013.01); *B60G 2204/1432* (2013.01); *B60G 2204/41* (2013.01); *B62D 25/025* (2013.01)

(58) Field of Classification Search
CPC ........ B60G 21/09; B60G 21/11; B60G 7/001; B60G 7/02; B60G 2204/1432; B60G 2204/41; B60G 3/202; B62D 25/025; B62D 25/08; B62D 25/20; B62D 25/2027; B62D 25/16; B62D 21/152; B62D 23/005; B60K 2001/0438; B60K 1/04

See application file for complete search history.

(56) References Cited

U.S. PATENT DOCUMENTS

| 2014/0015284 A1* | 1/2014 | Mildner | B62D 25/08 |
| | | | 296/193.08 |
| 2018/0134324 A1* | 5/2018 | Son | B60K 1/04 |
| 2019/0276081 A1* | 9/2019 | Otoguro | B62D 21/03 |

FOREIGN PATENT DOCUMENTS

| DE | 102007047402 B3 * | 10/2008 | ............. B60G 3/202 |
| JP | 2000238662 A | 9/2000 | |
| JP | 2007290665 A | 11/2007 | |

* cited by examiner

*Primary Examiner* — James A English
*Assistant Examiner* — Daniel M. Keck
(74) *Attorney, Agent, or Firm* — Hauptman Ham, LLP (57) ABSTRACT

A vehicle may include: a floor panel; a rocker extending along a side edge of the floor panel; a rear side member located on a rear side of the rocker and extending along a front-rear direction of the vehicle; and a suspension. The suspension may include a trailing arm; and a bracket connected to the trailing arm via a bush. The bracket may be fastened to the rocker at a first fastening point by a first bolt and fastened to the rear side member at a second fastening point by a second bolt.

4 Claims, 11 Drawing Sheets

VEHICLE

CROSS-REFERENCE TO RELATED APPLICATION

This application claims priority to Japanese Patent Application No. 2019-193498 filed on Oct. 24, 2019, the contents of which are hereby incorporated by reference into the present application.

TECHNICAL FIELD

The technology herein disclosed relates to a vehicle. In the present disclosure, the vehicle includes a gasoline-powered vehicle, an electric vehicle, a hybrid vehicle, a fuel-cell vehicle, and the like.

BACKGROUND

In a vehicle described in Japanese Patent Application Publication No. 2007-290665, its suspension includes a trailing arm. A tip portion of the trailing arm includes a bush. A peripheral portion of the bush is fixed to the trailing arm. A shaft portion of the bush is fixed to a rear side member (which is called a rear frame in Japanese Patent Application Publication No. 2007-290665) of a body. The trailing arm is therefore swingable about the bush relative to the rear side member.

SUMMARY

Depending on an arrangement of members of the body, there may not be enough space for attaching the bush to the rear side member. The inventors of the present disclosure contemplated attaching the bush to a connection between the rear side member and a rocker, and found that the connection failed to have a sufficient strength in case of attaching the bush to the connection. The present disclosure proposes a technology of attaching a bush to a connection between a rear side member and a rocker while ensuring strength of the connection.

A vehicle disclosed herein may comprise: a floor panel; a rocker extending along a side edge of the floor panel; a rear side member located on a rear side of the rocker and extending along a front-rear direction of the vehicle; and a suspension. The suspension may comprise a trailing arm; and a bracket connected to the trailing arm via a bush. The bracket may be fastened to the rocker at a first fastening point by a first bolt and fastened to the rear side member at a second fastening point by a second bolt.

In this vehicle, the trailing arm is connected to the bracket via the bush. The bracket is fixed to the rocker and the rear side member. According to this configuration, the bush can be attached to a connection between the rocker and the rear side member via the bracket. In this vehicle, the bracket is fastened to the rocker at the first fastening point and is fastened to the rear side member at the second fastening point. Coupling the rocker and the rear side member via the bracket as such enables the connection therebetween to have strength. Therefore, the connection between the rocker and the rear side member can have strength even when the bush is attached to the connection.

DETAILED DESCRIPTION

Figure 1:
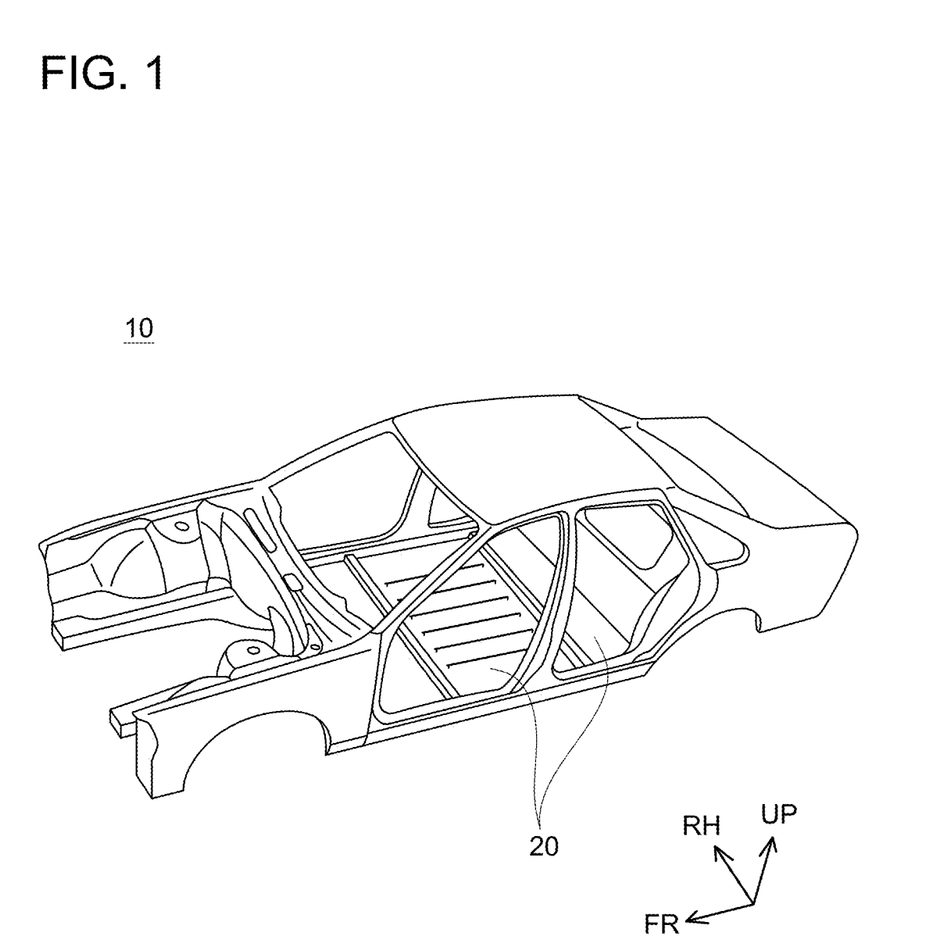
FIG. 1 is a perspective view of a body 10 in an electrically-powered vehicle.

An electrically-powered vehicle in an embodiment includes a traction motor mounted thereon. The electrically-powered vehicle travels by the traction motor driving a wheel. FIG. 1 shows a body 10 of the electrically-powered vehicle in the embodiment. The body 10 comprises a floor panel 20. In the drawings including FIG. 1, an arrow FR indicates a frontward direction of the vehicle, an arrow RH indicates a rightward direction of the vehicle, and an arrow UP indicates an upward direction of the vehicle.

Figure 2:
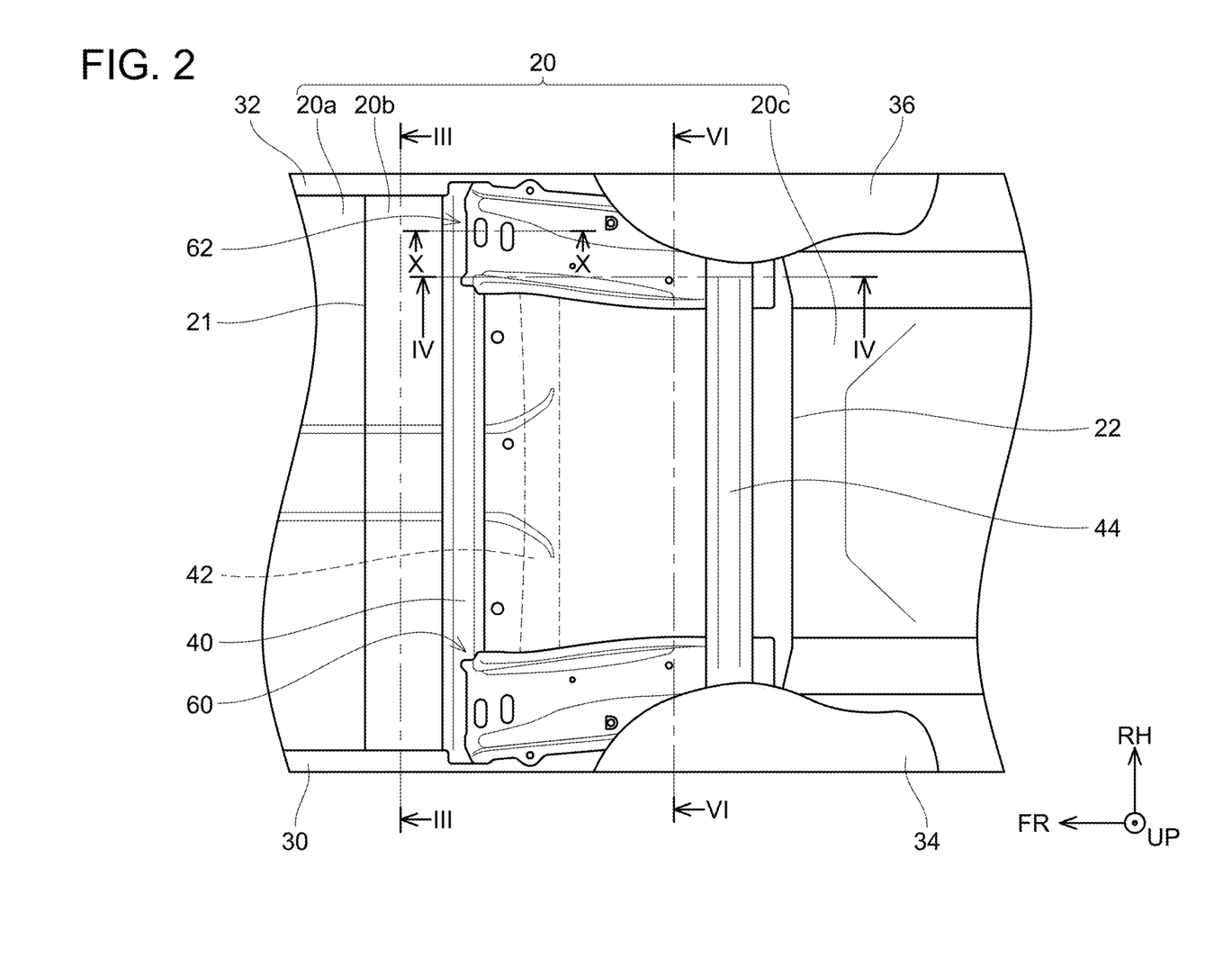
FIG. 2 is a plan view of an underbody viewed from above.

As shown in FIG. 2, the floor panel 20 includes a front floor panel 20a, a rear floor panel 20b, and a luggage floor panel 20c. The front floor panel 20a, the rear floor panel 20b, and the luggage floor panel 20c are arranged in this order from a front side toward a rear side of the vehicle. The front floor panel 20a, the rear floor panel 20b, and the luggage floor panel 20c are each constituted of a single steel plate (plate material). The rear floor panel 20b is welded to the front floor panel 20a at its front edge 21. The rear floor panel 20b is welded to the luggage floor panel 20c at its rear edge 22. The front floor panel 20a and the rear floor panel 20b constitute a floor of a cabin. The luggage floor panel 20c constitute a floor of a luggage space.

Figure 3:
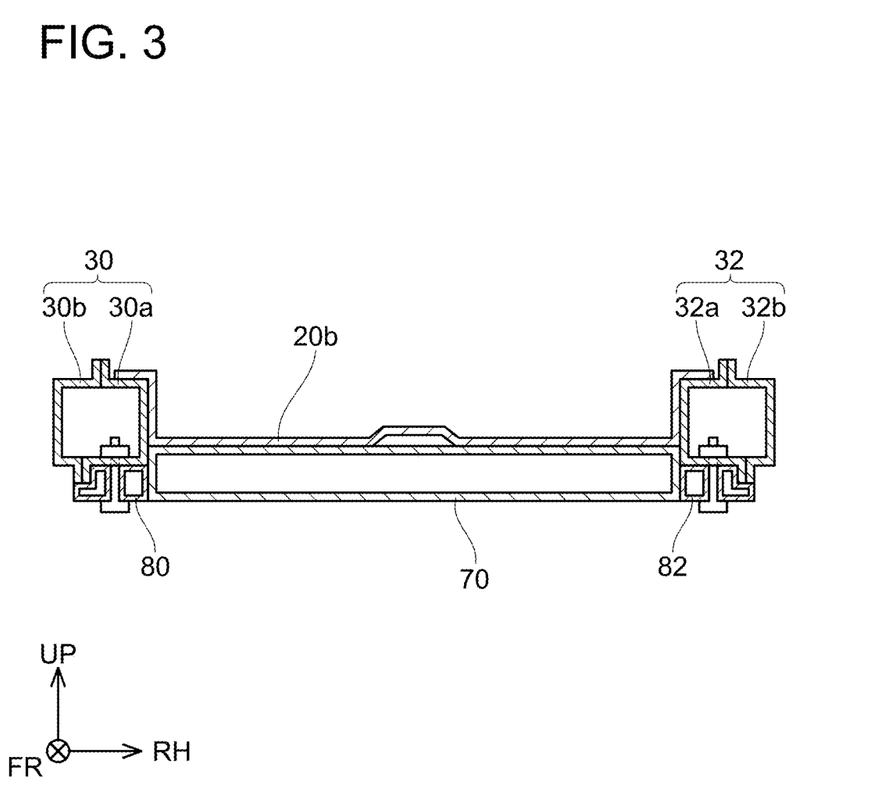
FIG. 3 is a cross-sectional view of the underbody taken along a line III-III in FIG. 2.

As shown in FIG. 2, a pair of rockers (a left rocker 30 and a right rocker 32) is arranged at opposite edges of the floor panel 20. FIG. 3 shows a cross-sectional view of an underbody at a position including the left rocker 30 and the right rocker 32 (a position of a line III-III in FIG. 2). As shown in FIG. 3, the right rocker 32 includes an inner rocker 32a and an outer rocker 32b. Each of the inner rocker 32a and the outer rocker 32b is an elongated member having a U-shaped cross section and extends long in a front-rear direction. The inner rocker 32a and the outer rocker 32b are assembled to include a space therebetween and welded to each other. The right rocker 32 thus has a hollow rectangular-tube shape, and extends long in the front-rear direction. As shown in FIG. 2, the right rocker 32 is disposed along a right edge of the floor panel 20. The right rocker 32 is joined to the front floor panel 20a and the rear floor panel 20b by welding or the like. As shown in FIG. 3, the left rocker 30, like the right rocker 32, includes an inner rocker 30a and an outer rocker 30b joined to each other. The left rocker 30 has a hollow rectangular-tube shape, and extends long in the front-rear direction. As shown in FIG. 2, the left rocker 30 is disposed along a left edge of the floor panel 20. The left rocker 30 is joined to the front floor panel 20a and the rear floor panel 20b by welding or the like.

As shown in FIG. 2, a pair of wheelhouse panels (a left wheelhouse panel 34 and a right wheelhouse panel 36) is disposed on the opposite edges of the floor panel 20. The right wheelhouse panel 36 is fixed to the right edge of the floor panel 20 on a rear side of the right rocker 32. The right wheelhouse panel 36, which is a plate material curved concavely, is fixed to the floor panel 20 such that its concave portion is oriented outward and downward. A right rear wheel is housed in the concave portion of the right wheelhouse panel 36. The right wheelhouse panel 36 is joined to the rear floor panel 20b and the like by welding or the like. The left wheelhouse panel 34 is fixed to the left edge of the floor panel 20 on a rear side of the left rocker 30. The left wheelhouse panel 34, which is a plate material curved concavely, is fixed to the floor panel 20 such that its concave portion is oriented outward and downward. A left rear wheel is housed in the concave portion of the left wheelhouse panel 34. The left wheelhouse panel 34 is joined to the rear floor panel 20b and the like by welding or the like.

As shown in FIG. 2, an indoor floor crossmember 40 and a rear floor crossmember 44 are disposed on an upper surface of the rear floor panel 20b.

Figure 4:
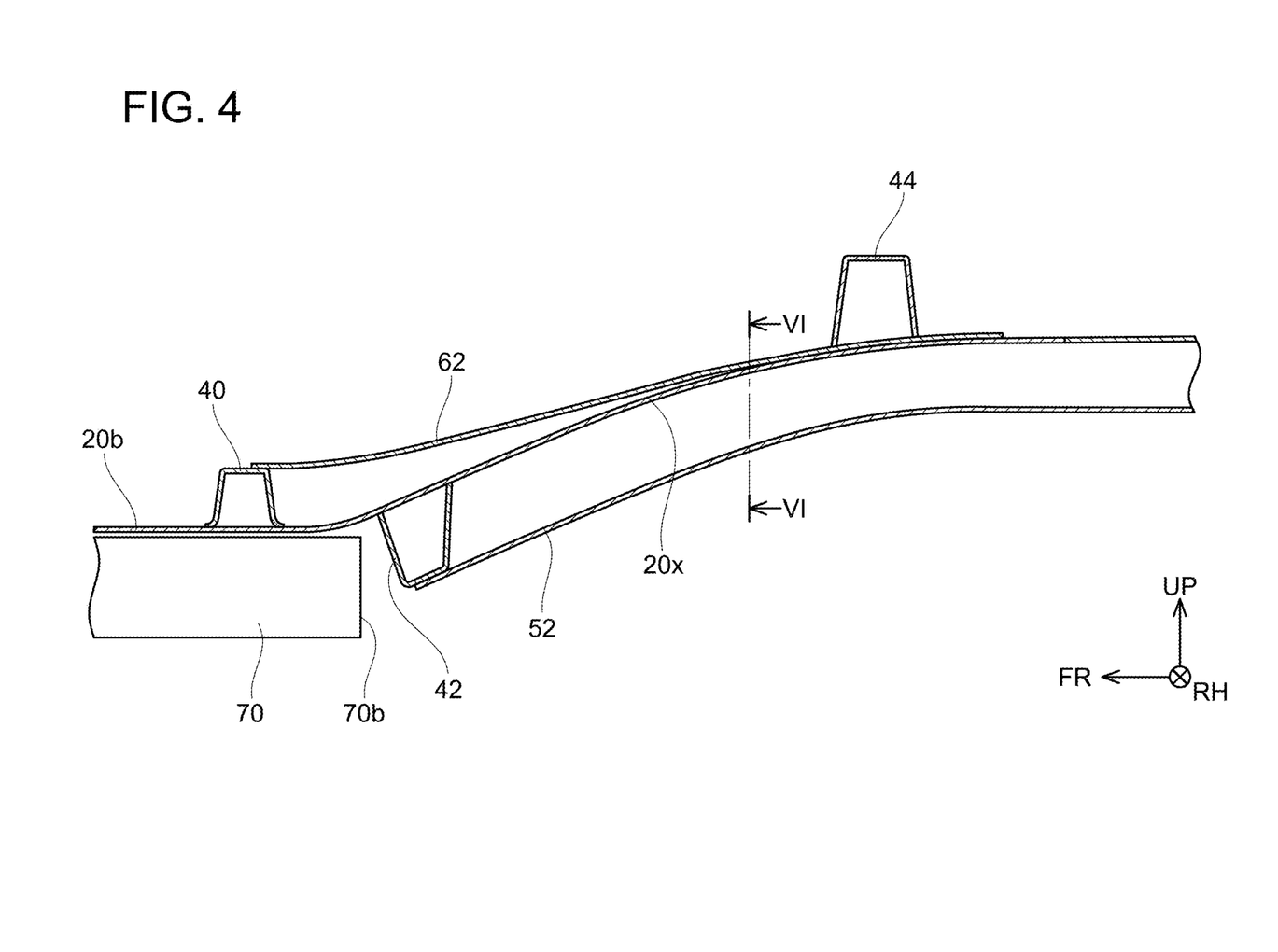
FIG. 4 is a cross-sectional view of the underbody taken along a line IV-IV in FIG. 2.

FIG. 4 is a cross-sectional view of the underbody taken along a line IV-IV in FIG. 2. As shown in FIG. 4, the indoor floor crossmember 40 is a beam-shaped member having a U-shaped cross section. The indoor floor crossmember 40 is disposed to protrude upward from the rear floor panel 20b. The indoor floor crossmember 40 extends long in a left-right direction. As shown in FIG. 2, the indoor floor crossmember 40 extends from the left rocker 30 to the right rocker 32. The indoor floor crossmember 40 is joined to the rear floor panel 20b, the left rocker 30, and the right rocker 32 by welding or the like.

As shown in FIG. 4, the rear floor crossmember 44 is a beam-shaped member having a U-shaped cross section. The rear floor crossmember 44 is disposed to protrude upward from the rear floor panel 20b. The rear floor crossmember 44 extends long in the left-right direction. The rear floor crossmember 44 is located on a rear side relative to the indoor floor crossmember 40. As shown in FIG. 2, the rear floor crossmember 44 extends from the left wheelhouse panel 34 to the right wheelhouse panel 36. The rear floor crossmember 44 is joined to the rear floor panel 20b, the left wheelhouse panel 34, and the right wheelhouse panel 36 by welding or the like.

Figure 5:
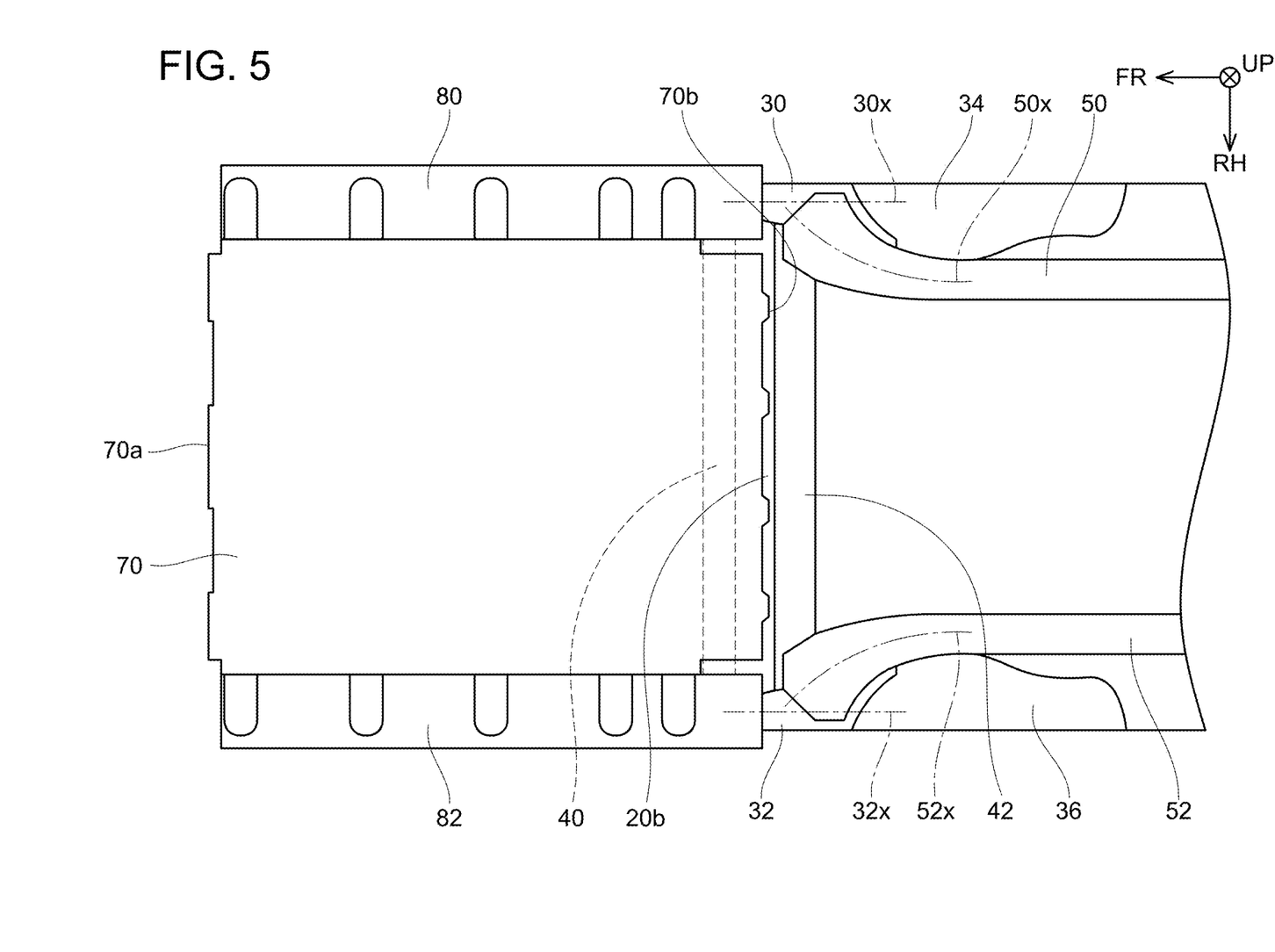
FIG. 5 is a plan view of the underbody viewed from below (a drawing that omits a suspension)

As shown in FIGS. 4 and 5, an outdoor floor crossmember 42 is disposed on a lower surface of the rear floor panel 20b. The outdoor floor crossmember 42 is a beam-shaped member having a U-shaped cross section. The outdoor floor crossmember 42 is disposed to protrude downward from the rear floor panel 20b. The outdoor floor crossmember 42 extends long in the left-right direction. The outdoor floor crossmember 42 is located on the rear side relative to the indoor floor crossmember 40. The outdoor floor crossmember 42 is located on a front side of the rear floor crossmember 44. The outdoor floor crossmember 42 extends from the left rocker 30 to the right rocker 32. The outdoor floor crossmember 42 is joined to the rear floor panel 20b, the left rocker 30, and the right rocker 32 by welding.

As shown in FIG. 4, the rear floor panel 20b extends horizontally on a front side of the indoor floor crossmember 40. The rear floor panel 20b is tilted to be directed more upward as it extends toward its rear side in a part on the rear side of the indoor floor crossmember 40 and on the front side of the rear floor crossmember 44 (in particular, in a part on a rear side of the outdoor floor crossmember 42). The rear floor panel 20b extends horizontally on a rear side of the rear floor crossmember 44. A portion of the rear floor panel 20b that is tilted to be directed more upward toward its rear side will hereinafter be called a tilted portion 20x.

As shown in FIG. 5, a battery case 70 is disposed below the floor panel 20. The battery case 70, which is an enclosed container, houses a main battery. The main battery is a battery that supplies power to the traction motor. A pair of EA members (a left FA member 80 and a right EA member 82) is located on opposite sides of the battery case 70 in the left-right direction. As shown in FIG. 3, the battery case 70 is fixed to the left rocker 30 and the right rocker 32 via the left EA member 80 and the right EA member 82, respectively.

As shown in FIG. 5, a front edge 70a of the battery case 70 is positioned near a front end of the cabin. As shown in FIGS. 4 and 5, a rear edge 70b of the battery case 70 is positioned on the rear side of the indoor floor crossmember 40 and on a front side of the outdoor floor crossmember 42. In other words, the battery case 70 extends from a position on the front side of the indoor floor crossmember 40 to a position on the rear side of the indoor floor crossmember 40 and on the front side of the outdoor floor crossmember 42.

Figure 6:
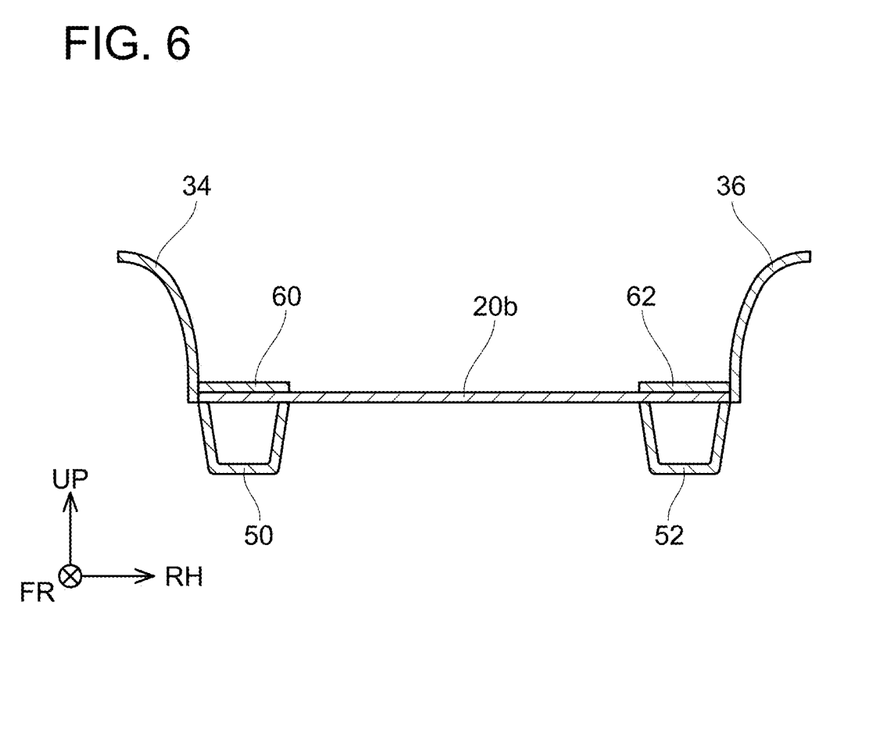
FIG. 6 is a cross-sectional view of the underbody taken along a line VI-VI in FIG. 2.

FIG. 6 shows a cross section of the underbody taken along a line VI-VI in FIGS. 2 and 4. As shown in FIG. 6, a pair of rear side members (a left rear side member 50 and a right rear side member 52) is disposed on the lower surface of the rear floor panel 20b. The right rear side member 52 is an elongated member having a U-shaped cross section. The right rear side member 52 is disposed to protrude downward from the rear floor panel 20b. The right rear side member 52 extends long in the front-rear direction. As shown in FIGS. 4 and 5, the right rear side member 52 covers a part of a lower surface of the outdoor floor crossmember 42 at and near its front end. The right rear side member 52 is joined to the outdoor floor crossmember 42 by welding. The right rear side member 52 covers a part of a lower surface of the right rocker 32 at and near its front end. The right rear side member 52 is joined to the right rocker 32 by welding. At a connection between the right rear side member 52 and the right rocker 32, a central axis 52x of the right rear side member 52 is positioned closer to the center of the vehicle (the center of the vehicle in the left-right direction) than a central axis 32x of the right rocker 32. As shown in FIGS. 4 and 5, the right rear side member 52 extends rearward from the outdoor floor crossmember 42 along a right edge of the rear floor panel 20b. As shown in FIG. 4, the right rear side member 52 is tilted to be directed more upward toward its rear side along the tilted portion 20x below the tilted portion 20x of the rear floor panel 20b. Although not shown, the right rear side member 52 extends to a rearmost portion of the vehicle, where the right rear side member 52 is connected to a rear bumper reinforcement. As shown in FIG. 6, the left rear side member 50 is an elongated member having a U-shaped cross section. The left rear side member 50 is disposed to protrude downward from the rear floor panel 20b. The left rear side member 50 extends long in the front-rear direction. As shown in FIG. 5, the left rear side member 50 covers a part of the lower surface of the outdoor floor crossmember 42 at and near its front end. The left rear side member 50 is joined to the outdoor floor crossmember 42 by welding. The left rear side member 50 covers a part of a lower surface of the left rocker 30 at and near its front end. The left rear side member 50 is joined to the left rocker 30 by welding. At a connection between the left rear side member 50 and the left rocker 30, a central axis 50x of the left rear side member 50 is positioned closer to the center of the vehicle (the center of the vehicle in the left-right direction) than a central axis 30x of the left rocker 30. The left rear side member 50 extends rearward from the outdoor floor crossmember 42 along a left edge of the rear floor panel 20b. The left rear side member 50 is tilted to be directed more upward toward its rear side along the tilted portion 20x below the tilted portion 20x of the rear floor panel 20b. Although not shown, the left rear side member 50 extends to the rearmost portion of the vehicle, where the left rear side member 50 is connected to the rear bumper reinforcement.

As shown in FIG. 2, reinforcements (a left reinforcement 60 and a right reinforcement 62) are located above the rear floor panel 20b. The right reinforcement 62 is located above the right rear side member 52. The right reinforcement 62 is joined to the indoor floor crossmember 40, the rear floor panel 20b, the right rocker 32, and the right wheelhouse panel 36 by welding or the like. The right reinforcement 62 reinforces the right rear side member 52. The left reinforcement 60 is located above the left rear side member 50. The left reinforcement 60 is joined to the indoor floor crossmember 40, the rear floor panel 20b, the left rocker 30, and the left wheelhouse panel 34 by welding or the like. The left reinforcement 60 reinforces the left rear side member 50.

Figure 7:
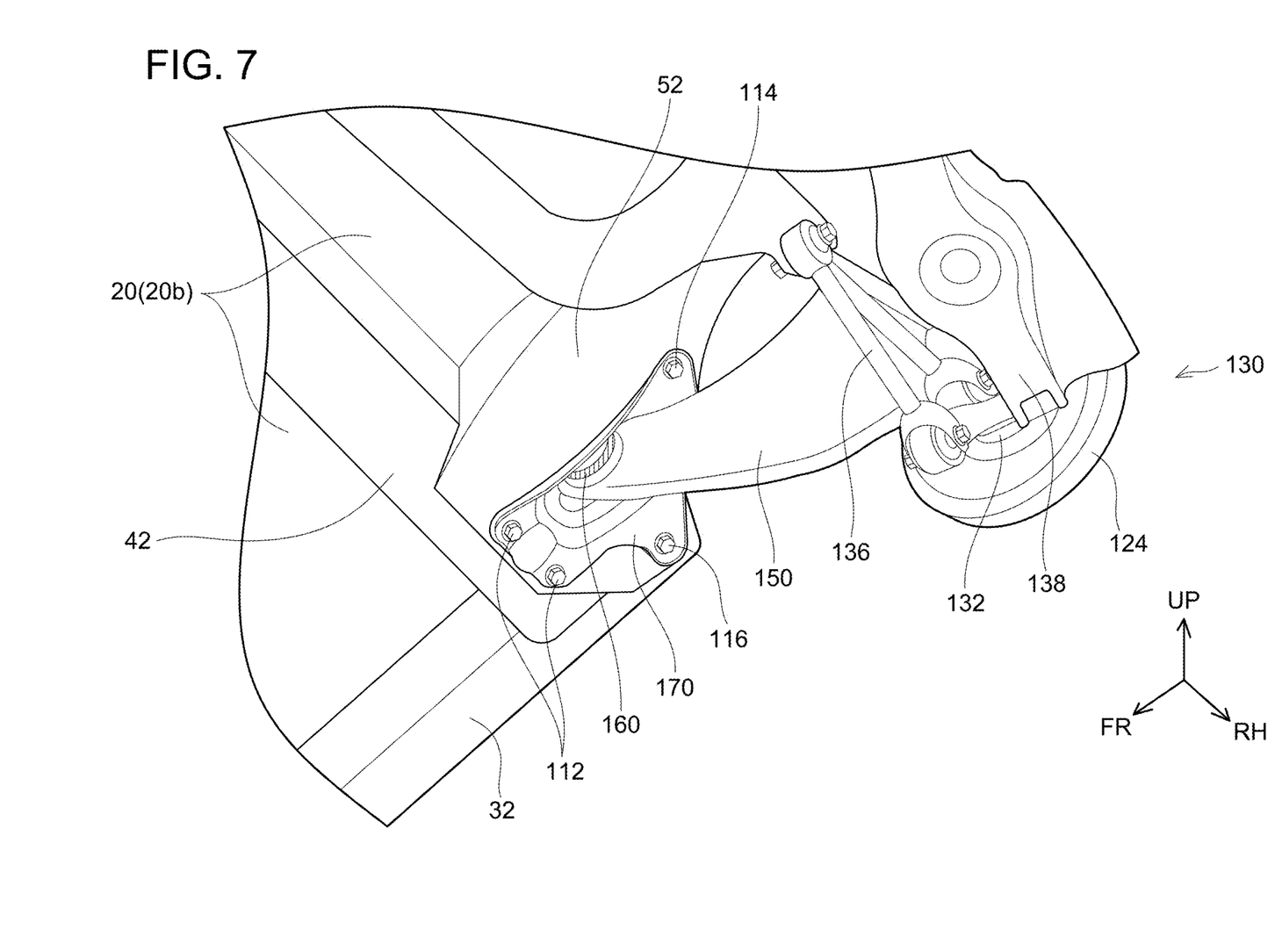
FIG. 7 is a perspective view of a portion to which a bracket 170 is attached, viewed from diagonally behind.
Figure 8:
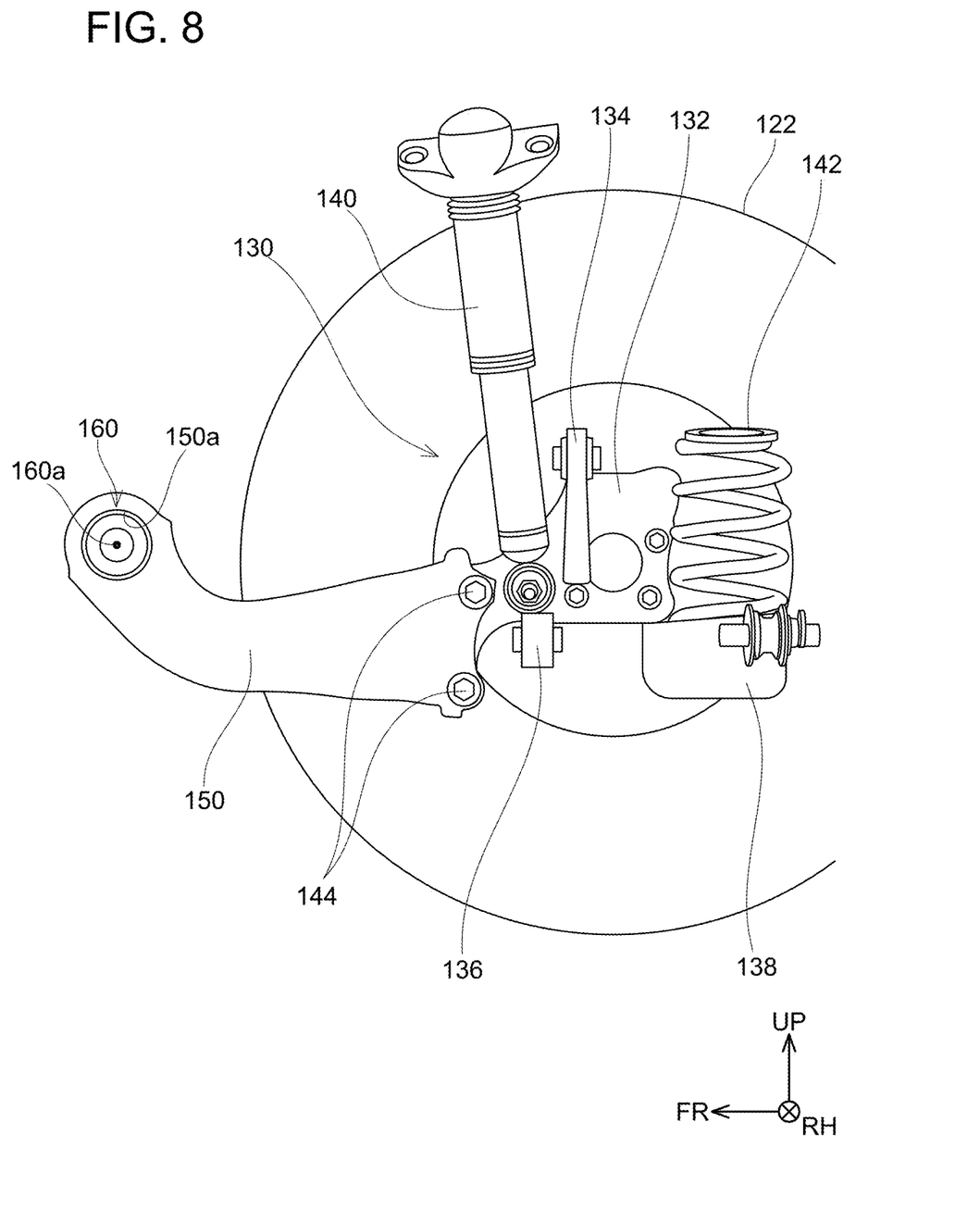
FIG. 8 is a plan view of a right rear wheel viewed from left (the center of the vehicle)

As shown in FIG. 7, a suspension 130 is located below the floor panel 20. FIG. 7 is a perspective view of a portion of the suspension 130 that supports the right rear wheel. Since the suspension 130 has a structure symmetrical in the left-right direction, the structure of the suspension 130 on a periphery of the right rear wheel will hereinafter be mainly described. FIG. 8 is a side view of the portion of the suspension 130 that supports the right rear wheel. As shown in FIG. 8, the suspension 130 includes a knuckle 132, an upper arm 134, a front lower arm 136, a rear lower arm 138, a shock absorber 140, a coil spring 142, and a trailing arm 150.

The knuckle 132 rotatably supports a hub 124 shown in FIG. 7. A wheel 122 shown in FIG. 8 is fixed to the hub 124. The knuckle 132 rotatably supports the wheel 122. The knuckle 132 is coupled to the body 10 by the upper arm 134, the front lower arm 136, and the rear lower arm 138 with a well-known configuration. The shock absorber 140 is interposed between the knuckle 132 and the body 10. The coil spring 142 is interposed between the rear lower arm 138 and the body 10.

The trailing arm 150 is fastened to the knuckle 132 by bolts 144. The trailing arm 150 extends frontward from the knuckle 132. A tip portion of the trailing arm 150 extends diagonally frontward and upward. A through hole 150a that penetrates the trailing arm 150 in the left-right direction is formed at a tip of the trailing arm 150. A bush 160 is located in the through hole 150a.

Figure 9:
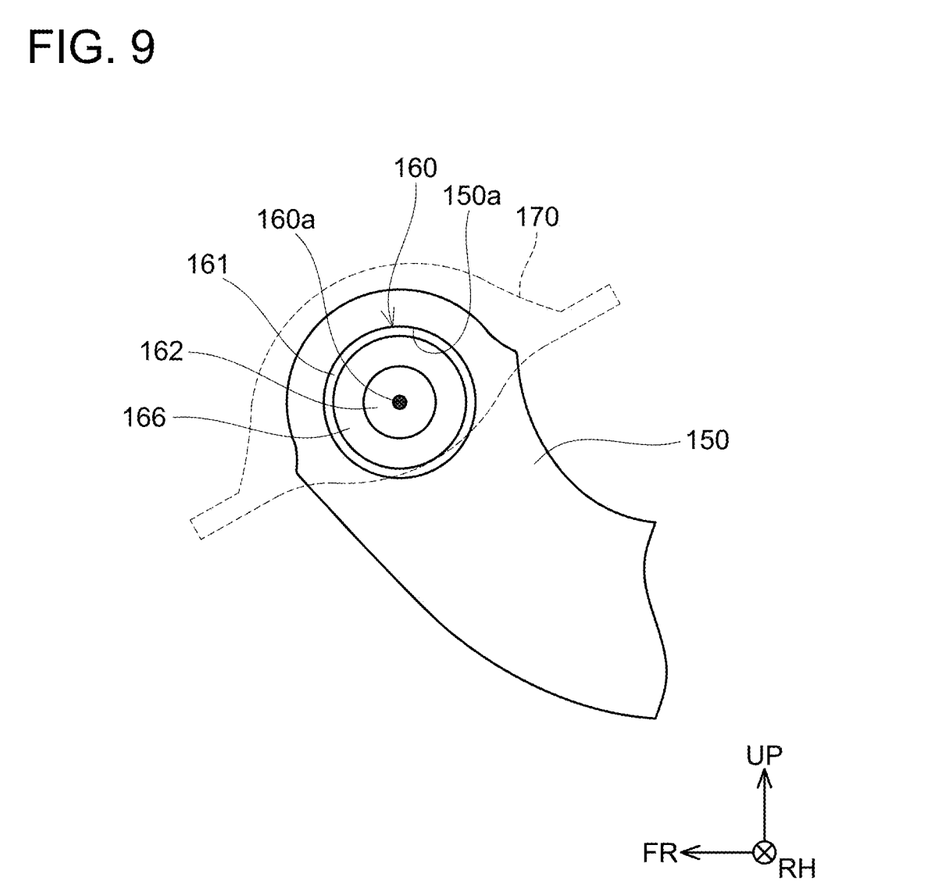
FIG. 9 is an enlarged view of a bush (a diagram that shows the bracket by dashed lines)

As shown in FIG. 9, the bush 160 includes a peripheral member 161, a shaft member 162, and an elastic member 166. The shaft member 162, which is constituted of metal, is located at a portion that includes a central axis 160a of the bush 160. The peripheral member 161, which is constituted of metal, constitutes a peripheral surface of the bush 160. The elastic member 166 is located between the shaft member 162 and the peripheral member 161. The elastic member 166 connects the shaft member 162 and the peripheral member 161 to each other. The elastic member 166 is constituted of an elastic body such as rubber. Due to elastic deformation of the elastic member 166, the shaft member 162 is swingable about the central axis 160a relative to the peripheral member 161. The peripheral member 161 is fixed to the trailing arm 150.

Figure 10:
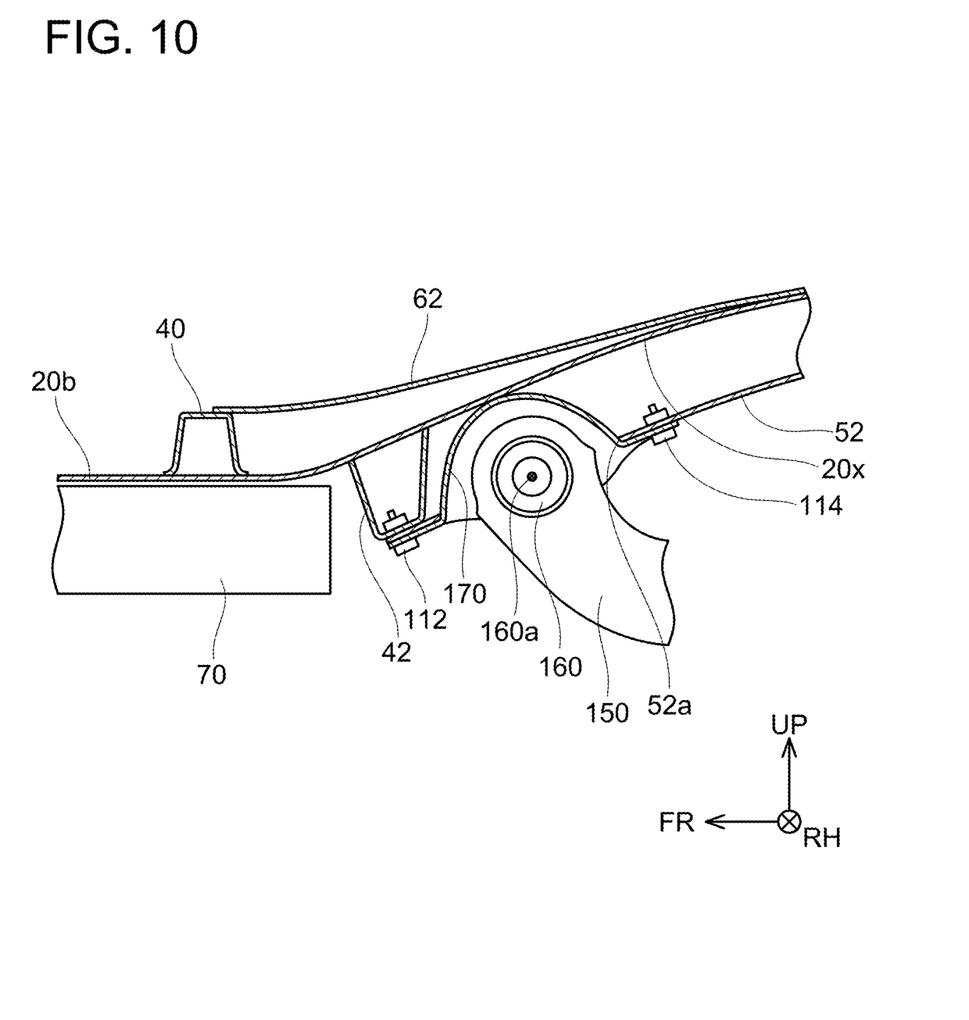
FIG. 10 is a cross-sectional view of the underbody taken along a line X-X in FIG. 2.

As shown in FIGS. 7, 9, and 10, the tip portion of the trailing arm 150 is inserted into a cup-shaped bracket 170. The tip portion of the trailing arm 150 is inserted into the bracket 170 together with the bush 160. The shaft member 162 of the bush 160 is fixed to the bracket 170 inside the bracket 170. The trailing arm 150 is therefore swingable about the central axis 160a of the bush 160 relative to the bracket 170.

As shown in FIG. 10, a through hole 52a is disposed in a part of a bottom surface of the right rear side member 52. The bracket 170 is inserted into the through hole 52a of the right rear side member 52 in an orientation that its concave portion is oriented downward.

Figure 11:
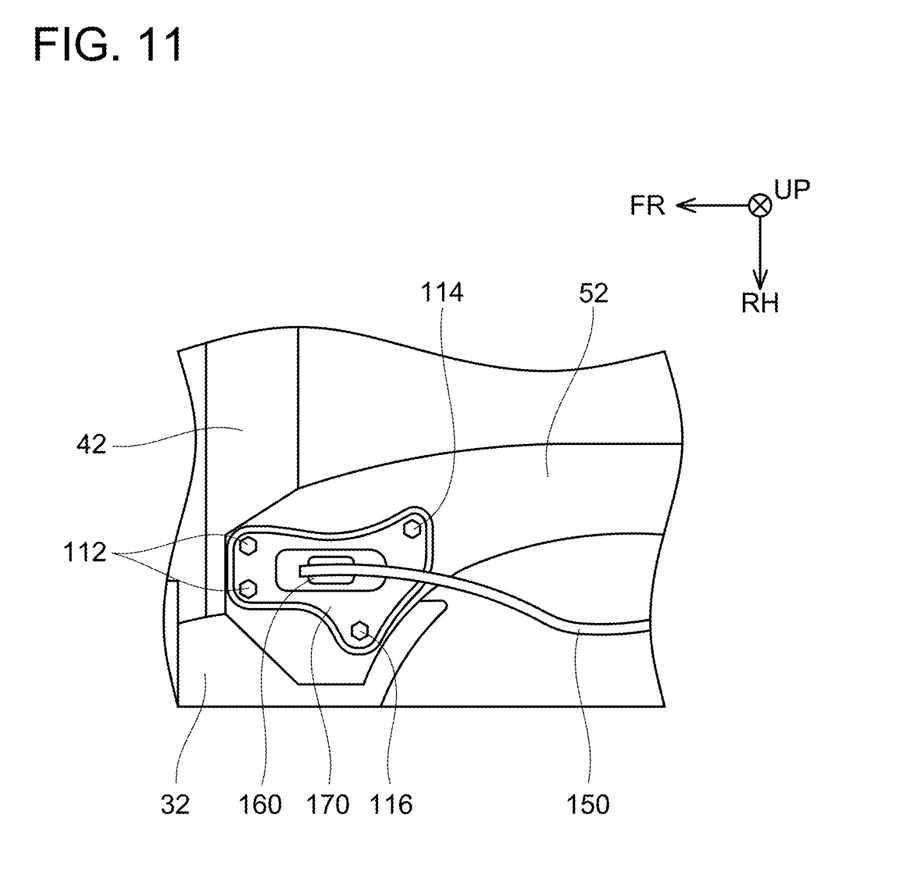
FIG. 11 is a plan view of the underbody viewed from below (an enlarged view of the portion to which the bracket 170 is attached).

As described above, the right rear side member 52 covers the part of the lower surface of the outdoor floor crossmember 42 at and near its front end. As shown in FIGS. 7 and 11, a front end portion of a flange of the bracket 170 extends to below the outdoor floor crossmember 42. The front end portion of the flange of the bracket 170 covers a lower surface of the right rear side member 52 below the outdoor floor crossmember 42. The bracket 170 is fastened to the outdoor floor crossmember 42 and the right rear side member 52 by two bolts 112. In other words, each of the bolts 112 collectively fastens the outdoor floor crossmember 42, the right rear side member 52, and the bracket 170. The bracket 170 is fastened to the right rear side member 52 by a bolt 114 on a rear side of the bush 160. As described above, the right rear side member 52 covers the part of the lower surface of the right rocker 32 at and near its front end. A part of the flange of the bracket 170 extends to below the right rocker 32. A part of the flange of the bracket 170 covers the lower surface of the right rear side member 52 below the right rocker 32. The bracket 170 is fastened to the right rocker 32 and the right rear side member 52 by a bolt 116. In other words, the bolt 116 collectively fastens the right rocker 32, the right rear side member 52, and the bracket 170. As described above, the outdoor floor crossmember 42, the right rocker 32, and the right rear side member 52 are welded to one another. The outdoor floor crossmember 42, the right rocker 32, and the right rear side member 52 are coupled to one another via the bracket 170. Connections between the outdoor floor crossmember 42, the right rocker 32, and the right rear side member 52 is reinforced by the bracket 170.

Similar to the trailing arm 150 on a right side of the suspension 130, a trailing arm on a left side of the suspension 130 is also connected to the body 10 via a bracket. The bracket for the trailing arm on the left side is fastened to the outdoor floor crossmember 42, the left rocker 30, and the left rear side member 50 by bolts. In other words, the outdoor floor crossmember 42, the left rocker 30, and the left rear side member 50 are coupled to one another via the bracket.

Next, a function that the above-mentioned body 10 has will be described.

As described above, in the body 10 in the embodiment, the outdoor floor crossmember 42 is located on the rear side of the indoor floor crossmember 40. The battery case 70 extends from the position on the front side of the indoor floor crossmember 40 to the position on the rear side of the indoor floor crossmember 40 and on the front side the outdoor floor crossmember 42. As such, locating the outdoor floor crossmember 42 by displacing rearward away from the indoor floor crossmember 40 and allowing the battery case 70 to extend into a created space therebetween enables upsizing of the battery case 70. Due to this, a capacity of a main battery contained in the battery case 70 can be increased.

Due to the upsizing the battery case 70 as described above, the outdoor floor crossmember 42 is located on the rear side of the indoor floor crossmember 40, thus a space for attaching the bracket 170 for the trailing arm 150 to the right rear side member 52 is reduced. Accordingly, in the vehicle in the embodiment, the bracket 170 is installed at the connection between the right rear side member 52 and the right rocker 32. The bracket 170 is fastened to the right rocker 32 by the bolt 116. The bracket 170 is fastened to the right rear side member 52 by the bolt 114. In other words, the right rocker 32 and the right rear side member 52 are coupled to each other by the bracket 170. This enables the connection between the right rocker 32 and the right rear side member 52 to have sufficient strength even when the bracket 170 is attached to the connection. Furthermore, the bolt 116 fastens the right rocker 32, the right rear side member 52, and the bracket 170 to one another at a fastening point of the bolt 116. Due to this, the strength of the connection between the right rocker 32 and the right rear side member 52 can further be improved.

In the vehicle in the embodiment, the bracket 170 is fastened to the outdoor floor crossmember 42 by the bolts 112. In other words, the right rocker 32, the right rear side member 52, and the outdoor floor crossmember 42 are coupled to one another by the bracket 170. Due to this, strength of the connections between these members is further improved. The bolts 112 fasten the outdoor floor crossmember 42, the right rear side member 52, and the bracket 170 to one another at a fastening point of the bolts 112. Due to this, the strength of the connection between the outdoor floor crossmember 42 and the right rear side member 52 is further improved.

When a collision from behind is applied to the vehicle, a load is applied forward to the right rear side member 52. In this case, the load is applied to the connections between the right rear side member 52, the right rocker 32, and the outdoor floor crossmember 42. In the vehicle in the embodiment, these connections are reinforced by the bracket 170, so that the connections are less susceptible to being ruptured when receiving the load applied thereto. At the connections, in particular, the position of the central axis 52$x$ of the right rear side member 52 and the position of the central axis 32$x$ of the right rocker 32 are displaced in the left-right direction, so that a shearing load is applied to the connection between the right rear side member 52 and the right rocker 32. Since the right rear side member 52 and the right rocker 32 are coupled by the bracket 170, the connection therebetween has high strength against the shearing load. Moreover, there may also be a case where a load directed to the center of the vehicle is applied, by a collision, to the right rear side member 52. In this case, the load is applied to the connection between the right rear side member 52 and the right rocker 32 in a direction that separates the right rear side member 52 and the right rocker 32. Since the right rear side member 52 and the right rocker 32 are coupled by the bracket 170, the connection therebetween has high strength against the load in the separating direction. As such, according to this configuration, the connection between the right rear side member 52 and the right rocker 32 is effectively reinforced against the shearing load and the load in the separating direction. As such, safety of the vehicle against collisions can be further improved. The connections between the left rear side member 50, the left rocker 30, and the outdoor floor crossmember 42 are similarly reinforced by the bracket for the trailing arm.

In the above-mentioned embodiment, the battery case 70 is located below the floor panel 20. However, in place of the battery case 70, another storage configured to store energy source may be located. For example, in a vehicle that uses gasoline as its energy source, a gasoline tank may be located below the floor panel 20. In a vehicle that uses hydrogen as its energy source, a hydrogen tank may be located below the floor panel 20. According to the above-described structure, the storage located below the floor panel 20 can be upsized and store much energy source regardless of the types of the storage.

Some of the features characteristic to the technology disclosed herein will be listed below. It should be noted that the respective technical elements are independent of one another, and are useful solely or in combinations.

In an aspect of vehicle disclosed herein, the rocker, the rear side member, and the bracket may be fastened to each other at the first fastening point by the first bolt.

According to this configuration, the strength of the connection between the rocker and the rear side member can be increased.

In an aspect of vehicle disclosed herein, the vehicle may further comprise an outdoor floor crossmember protruding downward from the floor panel and extending along a left-right direction of the vehicle. The bracket may be fastened to the outdoor floor crossmember at a third fastening point by a third bolt.

According to this configuration, since the rocker, the rear side member, and the outdoor floor crossmember are coupled by the bracket, the strength of the connections therebetween can be increased.

In an aspect of vehicle disclosed herein, the vehicle may further comprise a storage configured to store an energy source, the storage being located below the floor panel and on a front side of the outdoor floor crossmember.

In this configuration, since it is difficult to ensure a space for attaching the bracket to the rear side member, a configuration in which the bracket is attached to the connection between the rocker and the rear side member is more effective.

In an aspect of vehicle disclosed herein, the rear side member, the outdoor floor crossmember, and the bracket may be fastened to each other at the third fastening point by the third bolt.

According to this configuration, the strength of the connections between the rocker, the rear side member, and the outdoor floor crossmember can be increased.

In an aspect of vehicle disclosed herein, a central axis of the rear side member may be located closer to a center of the vehicle than a central axis of the rocker at a connection between the rear side member and the rocker.

In this configuration, when the vehicle is collided from behind, a shearing load is likely to be applied to the connection between the rear side member and the rocker. However, since the rear side member and the rocker are coupled via the bracket, strength of the connection between the rear side member and the rocker against the shearing load can be ensured.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A vehicle, comprising:
    a floor panel;
    a rocker attached to and extending along a side edge of the floor panel;
    a rear side member located on a rear side of the rocker and extending along a front-rear direction of the vehicle; and
    a suspension;
    wherein
    the suspension comprises:
        a trailing arm; and
        a bracket connected to the trailing arm via a bush,
    the bracket is directly fastened to the rocker at a first fastening point by a first bolt and directly fastened to the rear side member at a second fastening point by a second bolt, and
    the rocker, the rear side member, and the bracket are directly fastened to each other at the first fastening point by the first bolt.

2. A vehicle, comprising:
    a floor panel;
    a rocker attached to and extending along a side edge of the floor panel;
    a rear side member located on a rear side of the rocker and extending along a front-rear direction of the vehicle;
    a suspension; and
    an outdoor floor crossmember protruding downward from the floor panel and extending along a left-right direction of the vehicle,
    wherein
    the suspension comprises:
        a trailing arm; and
        a bracket connected to the trailing arm via a bush,
    the bracket is directly fastened to the rocker at a first fastening point by a first bolt and directly fastened to the rear side member at a second fastening point by a second bolt, and
    the bracket is directly fastened to the outdoor floor crossmember at a third fastening point by a third bolt.

3. The vehicle of claim 2, further comprising a storage configured to store an energy source, the storage being located below the floor panel and on a front side of the outdoor floor crossmember.

4. The vehicle of claim 2, wherein the rear side member, the outdoor floor crossmember, and the bracket are directly fastened to each other at the third fastening point by the third bolt.

* * * * *